J. CONCEIÇÃO.
APPARATUS FOR GATHERING COFFEE.
APPLICATION FILED JUNE 4, 1909.
968,742.
Patented Aug. 30, 1910.
4 SHEETS—SHEET 3.
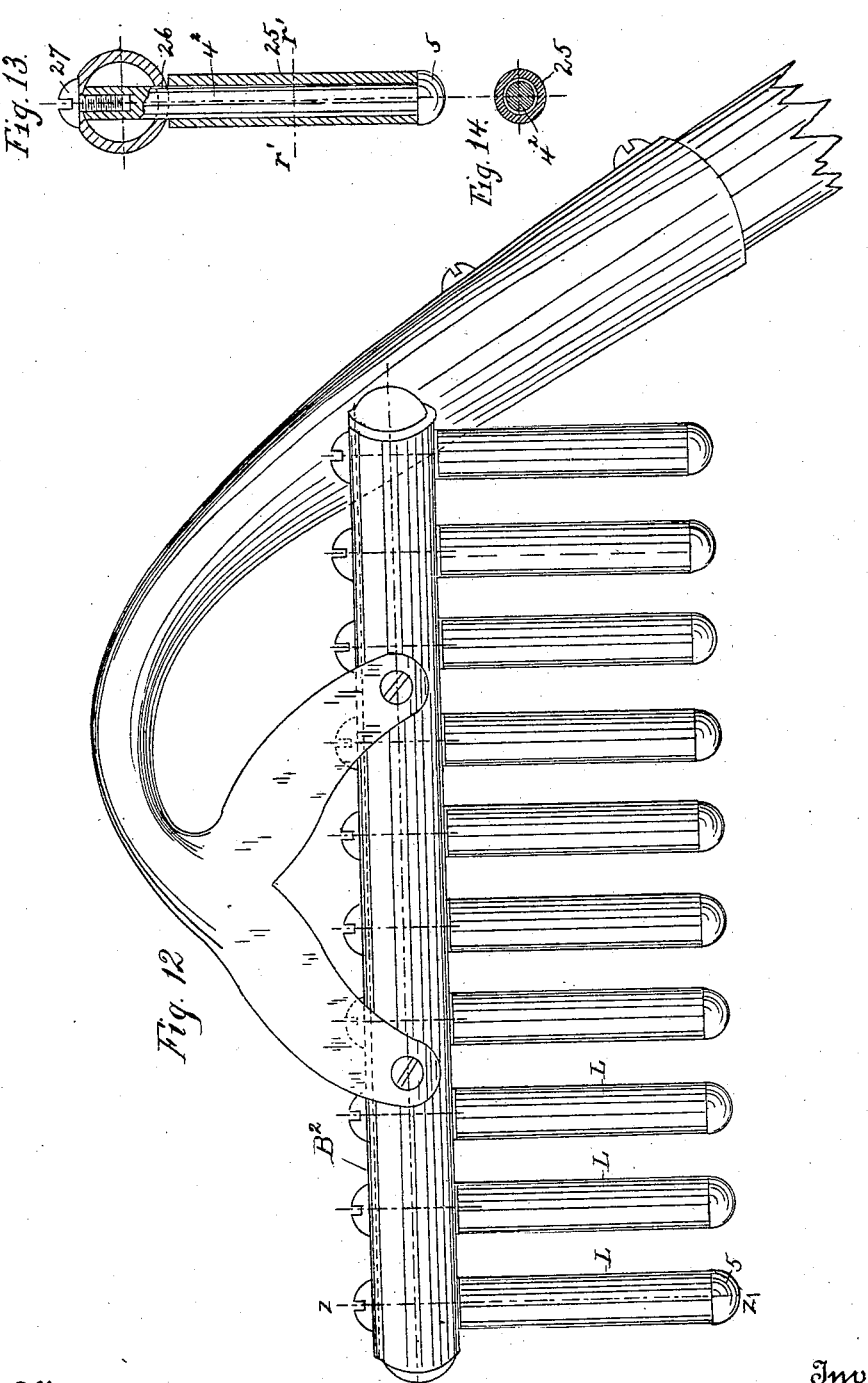
Witnesses:
W. P. Burke
John G. Prewal.
Inventor
Julio Conceição
By his Attorney
Wm. Wallace White
THE NORRIS PETERS CO., WASHINGTON, D. C.

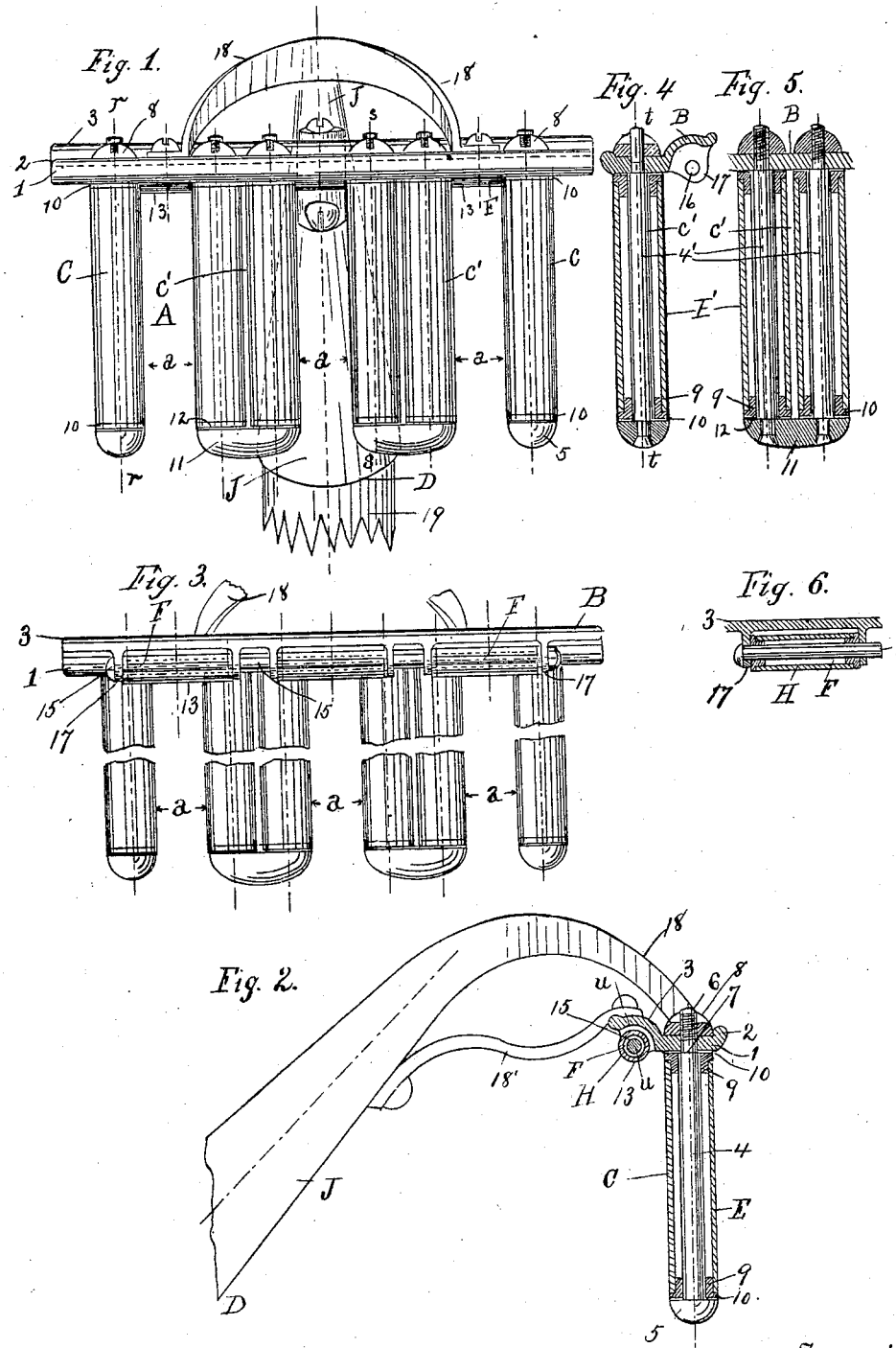

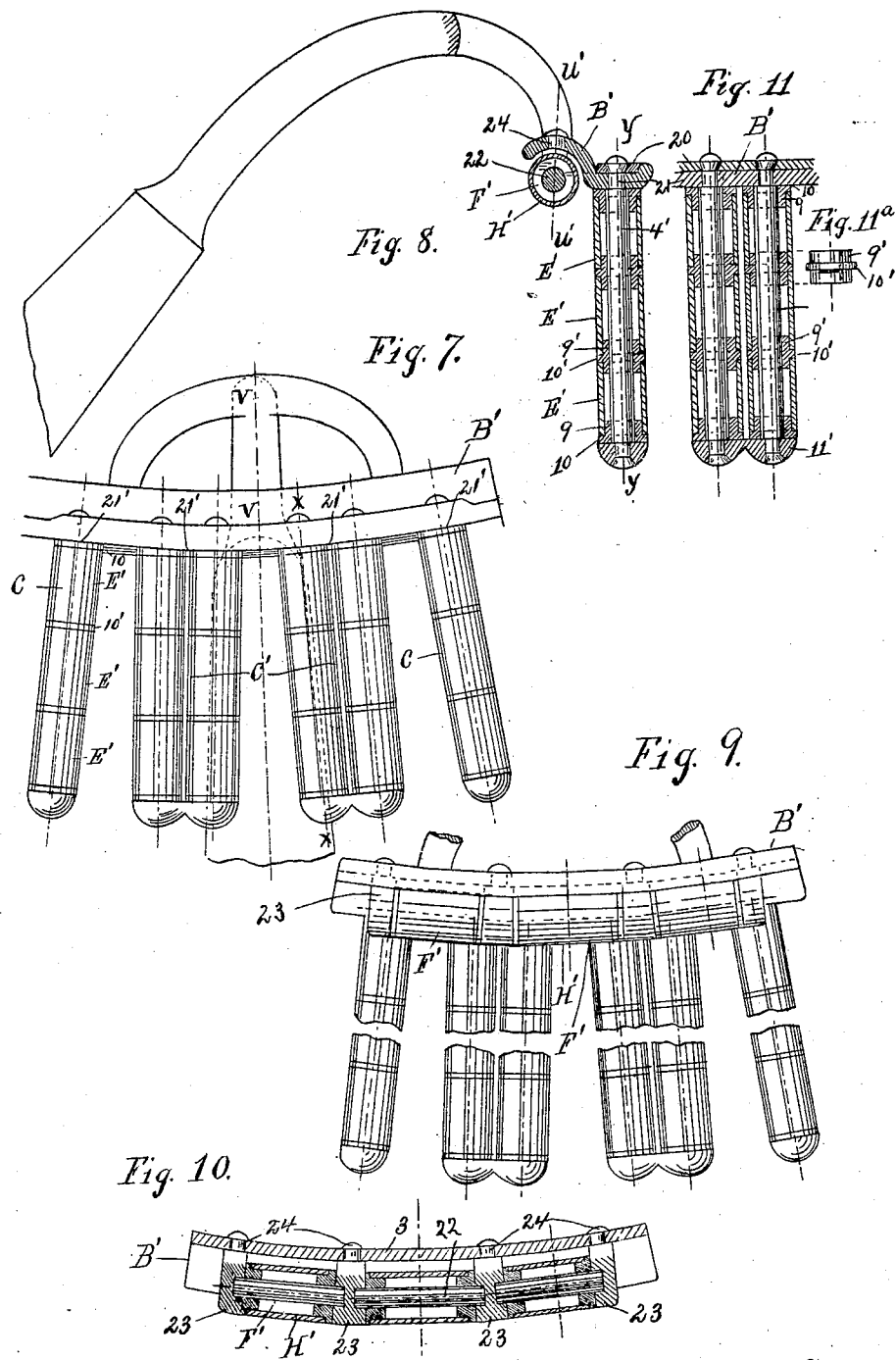

J. CONCEIÇÃO.
APPARATUS FOR GATHERING COFFEE.
APPLICATION FILED JUNE 4, 1909.
968,742.
Patented Aug. 30, 1910.
4 SHEETS—SHEET 4.
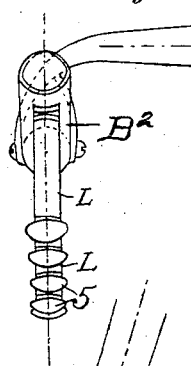
Fig. 16.
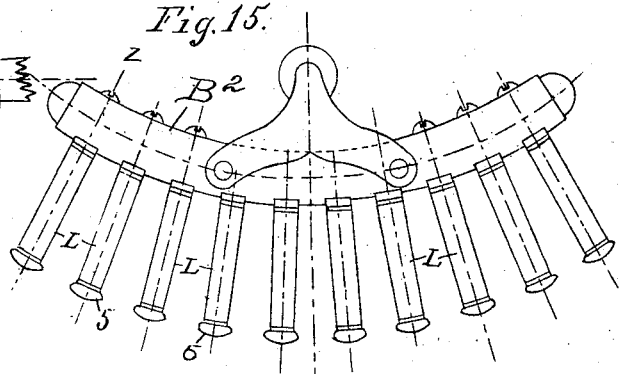
Fig. 15.
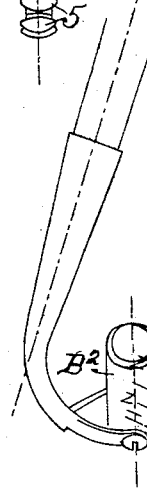
Fig. 18.
Fig. 17.
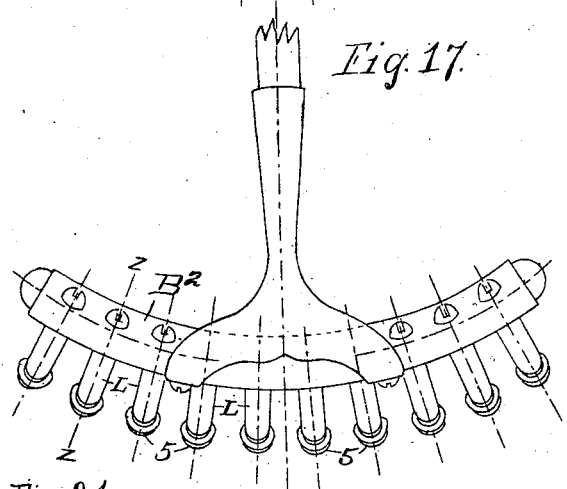
Fig. 21.
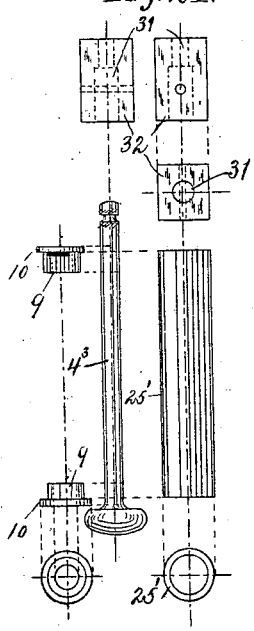
Fig. 20. Fig. 19.
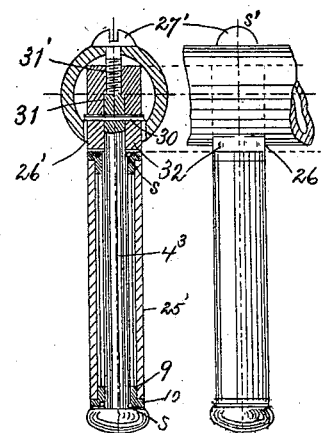
Witnesses:
W. P. Burke
John A. Percival
Inventor
Julio Conceição
By his Attorney
Wm Wallace White
THE NORRIS PETERS CO., WASHINGTON, D. C.

UNITED STATES PATENT OFFICE.

JULIO CONCEIÇÃO, OF SANTOS, BRAZIL.

APPARATUS FOR GATHERING COFFEE.

968,742.

Specification of Letters Patent. Patented Aug. 30, 1910.

Application filed June 4, 1909. Serial No. 500,217.

*To all whom it may concern:*

Be it known that I, JULIO CONCEIÇÃO, a citizen of the United States of Brazil, residing at Santos, State of São Paulo, United States of Brazil, have invented certain new and useful Improvements in Apparatus for Gathering Coffee, of which the following is a specification.

The object of my invention is an instrument in the form of a rake for use in harvesting or gathering coffee or castor oil and other beans, and generally all sorts of beans or fruits capable of being gathered by causing their branches to pass between the teeth of a comb set at convenient intervals in such a manner that the fruits and beans, etc., when caught by the comb cannot escape between the teeth, and are thus raked off the branches. In order to accomplish this my rake-shaped implement comprises essentially a metal comb the teeth of which project from a cross bar on which they are set and which is fixed to an operating handle. This cross bar may be either straight, with the teeth projecting in a straight line parallel to one another, or, if found more convenient, it may be a bend forming the arc of a circle, with the teeth projecting radially in the shape of a fan. I prefer the latter arrangement inasmuch as it possesses the advantage of allowing the comb to retain more easily with the teeth the branches along which it is intended to run in order to rake off the fruits.

In the accompanying drawings which represent different ways of constructing the implement constituting my invention and adapted for gathering coffee: Figure 1 is a front elevation; Fig. 2 is a section on the line $r$—$r$, Fig. 1; Fig. 3 is a rear view; Fig. 4 is a section through the line $s$—$s$, Fig. 1; Fig. 5 is a section through the line $t$—$t$, Fig. 4; Fig. 6 is a section through the line $u$—$u$, Fig. 2; Fig. 7 is an elevation of a modification; Fig. 8 is a section through lines $v$—$v$ and $x$—$x$ of Fig. 7; Fig. 9 is a rear view; Fig. 10 is a section through the line $u'$—$u'$, Fig. 8; Fig. 11 is a section through the line $y$—$y$, Fig. 8; Fig. 11ª is an elevation of one of the rings 9'; Fig. 12 shows an oblique elevation of another modification; Fig. 13 is a section on the line $z$—$z$, Fig. 12; Fig. 14 is a section on line $r'$—$r'$, Fig. 13; Fig. 15 is an elevation of still another modification; Fig. 16 is an end view of Fig. 15; Fig. 17 shows another modification; Fig. 18 is an end view; Fig. 19 is a side view showing one of the teeth of the instrument represented in Figs. 14 to 17; Fig. 20 is a section on the line $s'$—$s'$, Fig. 19; Fig. 21 shows individually the different parts used in supporting said teeth.

Referring to Figs. 1 to 6, A is a comb to the cross bar B of which, bearing the simple extreme teeth C and the double intermediate teeth C', is fixed the handle D which, together with the comb A constitutes a rake. This cross bar B, which may show any suitable profile in cross section as for instance that of a pipe or of a flat bar, is preferably shaped out of a rod of soft cast iron or other metal, having a flat straight part 1 from the edges of which project a flange 2 and a concavo-convex flange 3. Each of the extreme teeth C comprises a rod 4 terminating at the bottom in a stud 5 forming a shoulder with rod 4 and having at the upper end a threaded reduced portion 6, forming a shoulder at 7, and which fits into the bore in the cross bar B where it is secured by means of the shoulder 7 and of a nut 8 which presses the cross bar against the shoulder 7. Between the lower face of part 1 of the cross bar B and the shoulder of stud 5, a pipe E is maintained on the rod 4, fitted at the extremities with rings 9 with flanges 10, arranged so as to revolve freely on the rod and in the pipe. The intermediate teeth or double teeth C' comprehend two parallel rods 4' similar to rods 4 and like the latter secured at the upper end and in like manner to cross bar B. These rods are connected by their lower extremities by means of a double stud 11, having a flat upper face 12, on which are riveted or otherwise securely fastened the lower extremities of the said rods. These rods hold tubes E' similar to tube E, constructed and fitted in like manner. The distance between rods 4' is arranged in such a way that the tubes remain slightly apart from one another. Transverse rollers F are arranged to extend across the free spaces *a* between the consecutive teeth and appear behind the latter with their lower extremity 13 projecting below the lower face of the flat portion 1 of cross bar B. Each of these rollers is formed with a tube H capable of revolving freely by means of the flanged rings on rod 15 supported in bores 16 of pending ears protruding from the concavo-convex flange 3 and maintaining the tubes in position on rod 15. The comb A is secured by the flat portion 1 of the cross bar B to the arms 18 of a socket J into which the wooden stock 19 fits forming together with the socket J the handle D of the implement; a third arm 18' may if desired be made to connect the outer edge of flange 3 to the socket J. The teeth and the rollers in the instrument the form of which I have thus described are mounted on a straight cross bar B; they may, however, if found convenient, be mounted on cross bar B' curved in the shape of an arc of a circle, as shown in Figs. 7, 8 and 9.

In the form of construction shown in Figs. 7 to 11 the revolving part of teeth C and C' of the comb A consists of short tubes E' of even diameter. These tubes are mounted on their rods 4 and 4' by means of rings 9 with flanges 10 and of rings 9' with center collars 10' as clearly shown in Figs. 8 and 11 and 11a, the said rings being arranged to revolve freely on their supporting rods and inside their respective tubes. Rods 4 and 4' are fixed to the bearing bar B' by means of washers or of a small flat bar 20, reaching the whole length of the cross bar, into which the shouldered upper extremities 21 of the rods are riveted (Figs. 8, 9 and 11), while the lower extremity of the rods of the double teeth are riveted in double studs 11' shaped as shown in Figs. 7 and 11. The extreme teeth C and the intermediate teeth C' protrude radially from the curved cross bar B' on the lower side of which are cut flat faces 21' to form the seat of flanges 10 of rings 9 adjacent to the cross bar. Each of the transverse rollers F' (Figs. 8, 9 and 10) comprises a small tube H', of similar construction and mounting as tubes H (Fig. 6). These rollers work on independent rods 22 fastened at their extremities to supporting ears 23 provided with a pin 24, arranged to be riveted to flange 3.

Figs. 12 to 21 relate to an instrument having the head piece or cross bar of the comb bearing simple teeth, made out of a piece of pipe to which the handle of the instrument is fixed as shown in the drawings. In the instrument represented in Fig. 12, the cross bar B² is made out of a straight piece of pipe bearing simple teeth L. Each of these teeth tightly fitted to the pipe is formed of a round rod 4² fixed to the said pipe and holding a small metal tube 25 arranged to revolve freely on the rod 4². The rod 4² ends at the lower extremity in a head or stud 5 having a flat face forming a shoulder and intended to maintain tube 25 on the said rod so as to allow it to revolve freely thereon. The upper extremity of rod 4² runs through bore 26 pierced in the wall of the pipe B² through which it is introduced into this pipe where it is secured by means of a bolt 27 the threaded stem of which after running through a bore pierced directly opposite bore 26, screws into a threaded perforation made in the upper end of the rod.

In Figs. 15–16 and 17–18 we have the representation of different instruments with the cross bar made out of a pipe and curved in the shape of an arc of a circle. Figs. 15 and 16 show the axis of the teeth and of the cross bar in the same plane and the teeth project radially from the cross bar. In Figs. 17 and 18 the teeth projecting radially from the cross bar are shown with the lines of their axis directed in the shape of the outline of a conical surface including the line of the axis of the cross bar. In these figures the teeth are constructed and fixed to the cross bar of the comb as shown in Figs. 19–20 and 21. A block 32 in the shape of a right prism is passed into the crossbar, and this block has a bore 31 therein which is slit to receive the smooth end of the rod 4³, said rod being secured in place by the pin 30 which passes through the end of the rod and through the block. Lengthwise on this rod rests a tube 25', the extremities of which are fitted with rings 9 with flanges 10 arranged to revolve freely in the tube and on the rod, the tube being held loosely in a longitudinal position between block 32 and stud 5. The rings may be so constructed as to allow of the insertion between them and the rod of antifriction balls as shown at $s$, thus permitting the tube to revolve more easily. The block is passed into the pipe through a square opening 26' and a screw 27' passing through the pipe and engaging with the screw threaded opening 31' forming a continuation of the perforation 31 holds the block in place. The tubes arranged to revolve freely on their supporting rods may, if found convenient, be coated with leather, india rubber or any other soft or elastic material.

Generally: I claim as the essential features constituting the improvements introduced in the application made for a patent under date of January 18, 1909:

1. An instrument for gathering coffee, comprising a crossbar, rotatable prongs carried thereby, and rotatable members carried by the crossbar and passing transversely across the spaces between the prongs.

2. A device of the class described, comprising a crossbar, bolts extending therefrom, tubes rotatably mounted on said bolts, bolts carried by the crossbar and extending transversely across the spaces between the before-mentioned bolts, and tubes rotatably carried by said bolts.

In testimony whereof I have hereunto set my hand in presence of two subscribing witnesses.

JULIO CONCEIÇÃO.

Witnesses:
JOAQUIM DE TOLEDO,
AGENOR SILVENA.